United States Patent [19]
Krone et al.

[11] Patent Number: 5,234,069
[45] Date of Patent: Aug. 10, 1993

[54] STEERING CONTROL SYSTEM FOR VEHICLES HAVING DUAL STEERING

[75] Inventors: John J. Krone, Dunlap; Delbert D. Dester, Washington, both of Ill.

[73] Assignee: Caterpillar Inc., Peoria, Ill.

[21] Appl. No.: 970,426

[22] Filed: Nov. 2, 1992

[51] Int. Cl.[5] ............................................. B62D 12/00
[52] U.S. Cl. .................................. 180/135; 180/139; 280/442
[58] Field of Search ............... 180/134, 135, 136, 139; 280/426, 432, 442, 456.1

[56] References Cited

U.S. PATENT DOCUMENTS

| | | | |
|---|---|---|---|
| 3,380,547 | 4/1968 | Granryd | 180/79.2 |
| 3,991,847 | 11/1976 | Unruh | 180/135 |
| 4,802,545 | 2/1989 | Nystuen et al. | 280/459 X |
| 4,917,204 | 4/1990 | Andrew et al. | 180/140 |

Primary Examiner—Margaret A. Focarino
Assistant Examiner—Victor E. Johnson
Attorney, Agent, or Firm—John W. Grant

[57] ABSTRACT

A steering control system is provided in which one pair of wheels of an articulated steer vehicle are steered in synchronization with the articulation steering. This is accomplished by providing a first two-position valve for directing the fluid exhausted from the rod end of one articulation steer jack to the head end chamber of one of the rear wheel steering jacks and to the rod end chamber of the other rear wheel steering jack for steering the rear wheels in a first direction and another two-position valve for directing the fluid exhausted from the rod end chamber of the other articulation steering jack to the rod end chamber of the one rear wheel steering jack and the head end chamber of the other rear wheel steering jack for steering the rear wheels in the opposite direction. The rod end and head end chambers of the rear wheel steering jacks are sized in relation to the rod end chambers of the articulation steering jacks so that the steering angle of the rear wheels is synchronized with the articulation steer angle even though the articulation steering jacks are much larger than the steering jacks for the rear wheels.

8 Claims, 2 Drawing Sheets

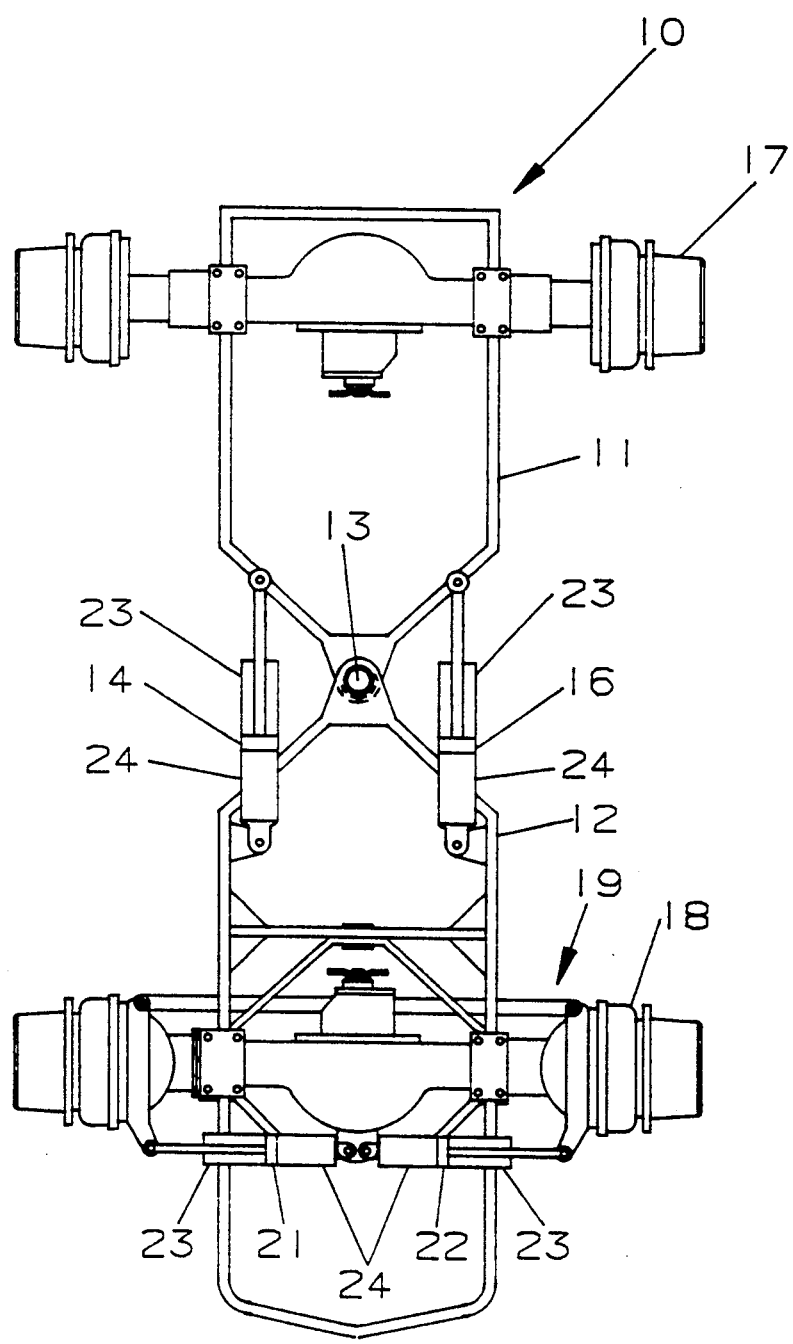
Fig_1_

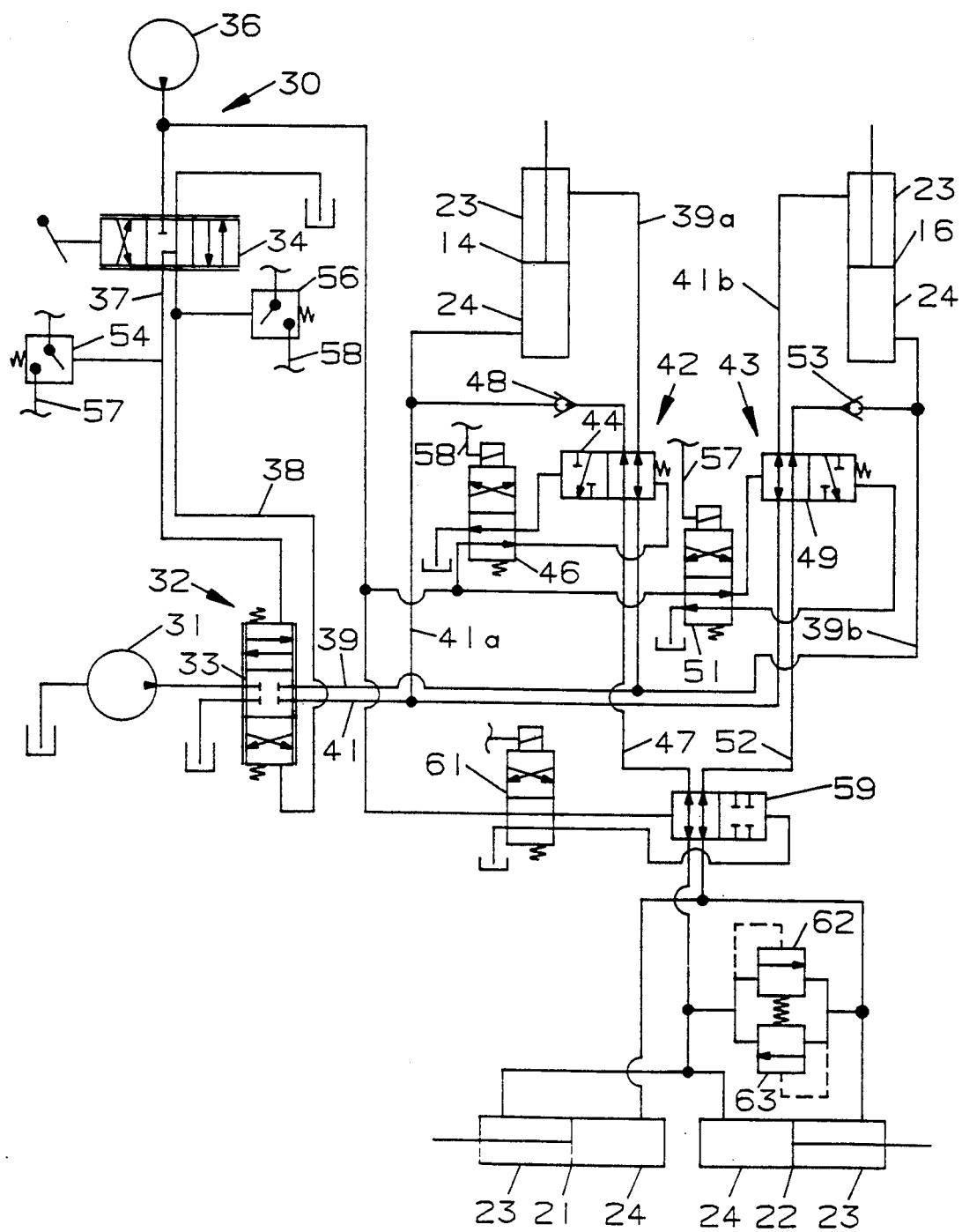
Fig_2_

STEERING CONTROL SYSTEM FOR VEHICLES HAVING DUAL STEERING

TECHNICAL FIELD

This invention relates to a steering control system and more particularly to a steering control system for a vehicle having two modes of steering.

BACKGROUND ART

The maneuverability of an articulated wheel loader is improved by adding rear wheel steering capability such that the loader can be steered by either articulation or by both articulation and rear wheel steering. One of the problems encountered with such vehicles is how to synchronize both types of steering in the dual steering mode. This is particularly troublesome on vehicles in which the hydraulic jacks associated with the articulation steering are much larger than the hydraulic jacks used for steering the rear wheels wherein the volume of fluid exhausted from the articulation steering jacks is drastically greater than the volume of fluid required to actuate the rear wheel steering jacks. It is desirable to synchronize the angle of the rear wheel steer with the articulation steer angle.

A solution to a similar problem is disclosed in U.S. Pat. No. 4,917,204 wherein both the front and rear wheels are steerable. Steering synchronization therein is achieved by using a diverter valve to divert the fluid exhausted from the steering jacks associated with the front wheels to power the steering jacks associated with the rear wheels in a master-slave relationship. Synchronization is easily achievable in that type of vehicle since the front and rear steering jacks disclosed therein are the same size. However, the simple employment of a diverter valve is not practical in a vehicle wherein one set of steering jacks are much larger than the other set of steering jacks.

The present invention is directed to overcoming one or more of the above problems.

DISCLOSURE OF THE INVENTION

In one aspect of the present invention, a steering control system is provided in combination with a vehicle having front and rear frames pivotally interconnected for articulated steering, first and second articulation steering jacks extending between the front and rear frames, first and second pairs of wheels mounted to the front and rear frames respectively, with one pair of the wheels being movable to affect steering of the vehicle, and third and fourth steering jacks mounted between the pair of movable wheels and the associated frame with each of the steering jacks having a rod end chamber and a head end chamber. The steering control system comprises a pump, valve means movable to a right steer position for directing fluid from the pump to the head end chamber of the first steering jack and the rod end chamber of the second steering jack and to a left steer position for directing fluid from the pump to the head end of the second steering jack and the rod end of the first steering jack; first auxiliary valve means for selectively communicating fluid exhausted from the rod end chamber of the first steering jack to the rod end chamber of the third steering jack and the head end chamber of the fourth steering jack when the valve means is in its right steer position; and second auxiliary valve means for selectively communicating fluid from the rod end chamber of the second steering jack to the rod end chamber of the fourth steering jack and the head end chamber of the third steering jack when the valve means is in the left steer position.

BRIEF DESCRIPTION OF THE DRAWINGS

FIG. 1 is a plan view of a portion of a vehicle embodying the present invention; and FIG. 2 is a schematic illustration of the control system of the present invention.

BEST MODE FOR CARRYING OUT THE INVENTION

Referring to the drawings, a vehicle partially shown at 10 has front and rear frames 11,12 pivotally interconnected at a pivot 13 for articulated steering. A pair of articulation steering jacks 14,16 extend between the front and rear frames on opposite sides of the pivot 13. A first pair of wheels 17 are connected to the front frame 11. A second pair of wheels 18 are connected to the rear frame 12 through an ackerman steering arrangement 19 so that they are movable to affect steering of the vehicle. The ackerman steering arrangement includes a pair of auxiliary steering jacks 21,22 mounted between the frame 12 and the wheels. Each of the steering jacks 14,16 and 21,22 have a rod end chamber 23 and a head end Chamber 24.

Referring to FIG. 2, a steering control system 30 includes a steering pump 31 and a valve means 32 connected to the pump 31 and being movable to a left steer position for directing fluid from the pump to the head end chamber 24 of the jack 16 and the rod end chamber 23 of the jack 14. The valve means 32 is movable to a right steer position for directing fluid from the pump to the head end chamber 24 of the jack 14 and the rod end chamber 23 of the jack 16. The valve means includes a pilot operated steering valve 33 and a pilot valve 34 connected to a pilot pump 36 and to opposite ends of the valve 33 through a pair of pilot lines 37,38.

A conduit 39 is connected to the valve 33 and to the rod end chamber 23 of the jack 14 through a branch conduit 39a and to the head end chamber 24 of the jack 16 through a branch conduit 39b. Another conduit 41 is connected to the valve 33 and to the head end chamber 24 of the jack 14 through a branch conduit 41a and to the rod end chamber 23 of the jack 16 through a branch conduit 41b.

The steering control system 30 also includes a pair of auxiliary steering valve means 42,43. The auxiliary steering valve means 42 selectively communicates fluid exhausted from the rod end chamber 23 of the steering jack 14 to the head end chamber 24 and the rod end chamber 23 of the jacks 22,21 respectively. The auxiliary steering valve means 42 includes a two-position, pilot operated valve 44 and a two-position solenoid valve 46 connected to the pilot pump 36 and to opposite ends of the valve 44. The valve 44 is disposed within the branch conduit 39a and a conduit 47 which is connected to the branch conduit 41a and to the rod end chamber 23 and the head end chamber 24 of the auxiliary steering jacks 21,22, respectively. A check valve 48 is disposed within the conduit 47 between the valve 44 and the branch line 41a.

Similarly, the auxiliary steering valve means 43 includes a two-position pilot operated valve 49 and a two-position solenoid valve 51 connected to the pump 36 and to opposite ends of the valve 49. The valve 49 is disposed within the branch conduit 41b and a conduit 52 connected to the branch conduit 39b and to the head end chamber 24 and the rod end chamber 23 of the steering jacks 21,22, respectively. A check valve 53 is disposed within the conduit 52 between the valve 49 and the branch conduit 39b.

A pair of pressure switches 54,56 are connected to the pilot lines 37,38, respectively, and to the solenoid valves 51,46 through a pair of lead lines 57,58.

A two-position pilot operated lock-up valve 59 is disposed within the conduits 47,52. A two-position solenoid valve 61 is connected to the pilot pump 36 and to the opposite ends of the lock-up valve 59. A pair of crossover relief valves 62,63 are suitably connected between the conduits 47 and 52.

INDUSTRIAL APPLICABILITY

In use, a left turn of the vehicle 10 is initiated by the operator manually moving the pilot valve 34 leftwardly as viewed in FIG. 2. This directs pressurized pilot fluid from the pump 36 through the line 37 to move the main steering valve 33 downwardly to communicate fluid from the pump 31 to the conduit 39. Fluid in the conduit 39 passes through the branch conduits 39a and 39b to simultaneously retract the steering jack 14 and extend the steering jack 16 to pivot the frames 11,12 counter-clockwise about the pivot 13 for articulated steering. The pressurized pilot fluid in the pilot line 37 actuates the pressure switch 54 directing an electrical signal through the lead line 57 to energize the solenoid valve 51 causing the pilot operated valve 49 to move leftwardly. The fluid exhausted from the rod end chamber 23 of the jack 16 is directed to the head end chamber 24 of the jack 21 and the rod end chamber 23 of the jack 22 by the valve 49. This causes extension of the jack 21 and retraction of the jack 22 to pivot the wheels 18 in a left turn direction in synchronization with the counter-clockwise articulation steering about the pivot 13.

The fluid exhausted from the head end chamber 24 of the steering jack 14 passes through the conduits 41a and 41 and the valve 33 and to the tank. Simultaneously, the fluid exhausted from the jacks 21,22 passes through the conduit 47, the valve 44, the check valve 48, and through the conduits 41a and 41, the valve 33 and to the tank.

Returning the pilot valve 34 to its neutral position vents the pilot line 37 causing the steering valve 33 to return to its neutral position and the switch 54 to open to de-energize the solenoid valve 51 resulting in the valve 49 returning to the position shown in the drawings. This hydraulically locks the steering jacks in their steer positions.

The precise geometry of the ackerman arrangement 19 and the displacements of the head end chambers 24 and rod end chambers 23 of the auxiliary steering jacks 21,22 are selected to synchronize the rear wheel steer with the articulation steer. Specifically, in the left turn situation described above, the steering jack 21 reaches its maximum extended position and the jack 22 reaches its maximum retracted position at the same time the articulation steering jack 16 reaches its fully extended position.

To return the vehicle to its straight ahead position, or to initiate steering of the vehicle to the right, the pilot valve 34 is manually moved to the right to move the main steering valve 33 upwardly to connect the pump 31 to the rod end chamber 23 of the jack 16 and the head end chamber 24 of the jack 14. This causes simultaneous extension of the jack 14 and retraction of the jack 16 to pivot the frames 11,12 clockwise about the pivot 13. The pressurized pilot fluid in the pilot line 38 actuates the pressure switch 56 directing an electrical signal through the lead line 58 to energize the solenoid valve 46 causing the pilot operated valve 44 to move rightwardly. The fluid exhausted from the rod end chamber 23 of the jack 14 is directed to the rod end chamber 23 of the jack 21 and the head end chamber 24 of the jack 22 by the valve 44. This causes extension of the jack 22 and retraction of the jack 21 to pivot the wheels 18 in a right turn direction in synchronization with clockwise articulation steering about the pivot 13.

The fluid exhausted from the head end chamber 24 of the hydraulic jack 16 passes through the conduits 39b,39, the valve 33 and to the tank. Simultaneously, the fluid exhausted from the jacks 21,22 passes through the conduit 52, the valve 49, the check valve 53 and through the conduits 39b and 39, the valve 33 and to the tank.

The rear wheels 18 can be hydraulically locked in the straight ahead, or any desired angular position, by energizing the solenoid valve 61 to shift the valve 59 leftward to block fluid flow through the conduits 47,52.

In view of the above, it is readily apparent that the structure of the present invention provides an improved steering control system for a vehicle having dual steering in which the rear wheel steering is synchronized with the articulation steering even though the articulation steering jacks are larger than the steering jacks for the rear wheels. This is accomplished by directing the fluid exhausted from the rod end of one of the articulation steer jacks for steering the rear wheels in one direction and the fluid exhausted from the rod end chamber of the other articulation steering jack for steering the rear wheels in the other direction. The steering jacks for the rear wheels are sized relative to the rod end chambers of the articulation steering jacks so that the steering angle of the rear wheels are synchronized with the articulation steering angle.

Other aspects, objects and advantages of this invention can be obtained from a study of the drawings, the disclosure and the appended claims.

What is claimed is:

1. A steering control system in combination with a vehicle having front and rear frames pivotally interconnected for articulated steering, first and second articulation steering jacks extending between the front and rear frames, first and second pairs of wheels mounted to the front and rear frames respectively, with one pair of the wheels being movable to affect steering of the vehicle, and third and fourth steering jacks mounted, between said pair of movable wheels and the respective frame, each of the steering jacks having a rod end chamber and a head end chamber; comprising a pump;
   valve means movable to a right steer position for directing fluid from the pump to the head end chamber of the first steering jack and the rod end chamber of the second steering jack and to a left steer position for directing fluid from the pump to the head end of the second steering jack and the rod end of the first steering jack;
   first auxiliary valve means for selectively communicating fluid exhausted from the rod end chamber of the first fluid jack to the rod end chamber of the third steering jack and the head end chamber of the fourth steering jack when the valve means is in said right steer position; and second auxiliary valve means for selectively communicating fluid from the rod end chamber of the second steering jack to the rod end chamber of the fourth steering jack and the head end chamber of the third steering jack when the valve means is in the left steer position.

2. The steering control system of claim 1 wherein the first auxiliary valve means includes a first two-position valve having a first operating position for communicating the valve means with the rod end chamber of the first steering jack and a second position communicating the rod end chamber of the first steering jack with the rod end chamber of the third steering jack and the head end chamber of the fourth steering jack.

3. The steering control system of claim 2 wherein the second auxiliary valve means includes a second two-position valve having a first operating position for communicating the valve means with the rod end chamber of the second steering jack and a second position communicating the rod end chamber of the second steering jack with the head end chamber of the third steering jack and the rod end chamber of the fourth steering jack.

4. The steering control system of claim 3 wherein the first two-position valve communicates the rod end chamber of the third steering jack and the head end chamber of the fourth steering jack with the valve means at the first position of the first two-position valve, and the second two-position valve communicates the rod end chamber of the fourth steering jack and the head end chamber of the third steering jack with the valve means at the first position of the second two-position valve.

5. The steering control system of claim 4 including a first check valve blocking fluid flow between the valve means and the first two-position valve and a second check valve blocking fluid flow between the valve means and the second two-position valve.

6. The steering control system of claim 5 including a lock up valve having a first position permitting fluid flow between the first and second two-position valves and the third and fourth hydraulic jacks and a second position blocking communication between the first and second two-position control valves and the third and fourth steering jacks.

7. The steering control system of claim 6 wherein the valve means includes a pilot operated steering valve movable between the right and left turn steering positions in response to receiving a pressure signal, and a pilot valve movable to a first position for directing a first pressure signal through a first pilot line to move the steering valve to the left steer position and a second signal through a second pilot line to move the steering valve to said right steer position.

8. The steering control system of claim 7 wherein the first two-position valve is a pilot operated having two ends valve and including a solenoid valve having a first position for directing pressurized fluid to one end of the first two-position valve and a second position for communicating pressurized fluid to the other end of the first two-position valve, and a pressure responsive switch fluidly connected to the first pilot line and electrically connected to the solenoid valve.

* * * * *